United States Patent

Heyward

(10) Patent No.: US 8,743,959 B2
(45) Date of Patent: Jun. 3, 2014

(54) MOTION ESTIMATION

(76) Inventor: Simon Nicholas Heyward, Middlesex (GB)

(*) Notice: Subject to any disclaimer, the term of this patent is extended or adjusted under 35 U.S.C. 154(b) by 1352 days.

(21) Appl. No.: 11/529,198

(22) Filed: Sep. 28, 2006

(65) Prior Publication Data

US 2007/0104275 A1 May 10, 2007

(51) Int. Cl.
*H04N 11/02* (2006.01)
*H04N 7/50* (2006.01)
*H04N 7/26* (2006.01)
*H04N 5/14* (2006.01)

(52) U.S. Cl.
CPC ............. *H04N 7/50* (2013.01); *H04N 7/26244* (2013.01); *H04N 5/145* (2013.01)
USPC .................................................. 375/240.16

(58) Field of Classification Search
None
See application file for complete search history.

(56) References Cited

U.S. PATENT DOCUMENTS

| | | | | |
|---|---|---|---|---|
| 5,886,742 | A * | 3/1999 | Hibi et al. ................ | 375/240.16 |
| 6,240,211 | B1 * | 5/2001 | Mancuso et al. .............. | 382/236 |
| 6,782,054 | B2 | 8/2004 | Bellers | |
| 7,720,150 | B2 * | 5/2010 | Lee et al. .................. | 375/240.16 |
| 2001/0014124 | A1 * | 8/2001 | Nishikawa ................ | 375/240.16 |
| 2002/0171759 | A1 * | 11/2002 | Handjojo et al. ............. | 348/452 |
| 2002/0181590 | A1 * | 12/2002 | Bellers ..................... | 375/240.16 |
| 2005/0207493 | A1 | 9/2005 | Kobayakawa | |
| 2005/0243927 | A1 * | 11/2005 | Hubrich et al. .......... | 375/240.16 |
| 2007/0183505 | A1 * | 8/2007 | Shimizu et al. .......... | 375/240.16 |

FOREIGN PATENT DOCUMENTS

| | | |
|---|---|---|
| EP | 0 474 276 A1 | 3/1992 |
| EP | 1 225 769 A3 | 10/2003 |
| WO | WO 02/087210 A2 | 10/2002 |

OTHER PUBLICATIONS

Tull D.L., et al., "Regularized blur-assisted displacement field estimation", Sep. 16-19, 1996, vol. 1, pp. 85-88 (4 pages).
Rekleitis I.M. Ed, Institute of Electrical and Electronics Engineers: "Optical Flow Recognition from the Power Spectrum of a Single Blurred Image", Sep. 16-19, 1996, vol. 3, pp. 791-794 (4 pages).
Hangu Yeo et al., "A cost function with position penalty for motion estimation in MPEG-2 video coding", Jul. 2000 vol. 3, pp. 1755-1758 (4 pages).
"Advanced Motion Estimation for Moving Picture Experts Group Encoders" IBM Technical Disclosure Bulletin, IBM Corp., vol. 39, No. 14, Apr. 1, 1996, pp. 323-324 (2 pages).
International Search Report and Written Opinion of the International Searching Authority, mailed Apr. 23, 2007 (11 sheets).
Section II of DeHaan, G,; Biezen, P.W.A.C., An Efficient True-Motion Estimator Using Candidate Vectors from a Parametric Motion Model, *Circuits and Systems for Video Technology*, IEEE, Transactions on, vol. 8, No. 1, Feb. 1998, pp. 85-91.

(Continued)

*Primary Examiner* — Joseph Ustaris
*Assistant Examiner* — Frederick Bailey
(74) *Attorney, Agent, or Firm* — Michael S. Garrabrants

(57) ABSTRACT

A method and apparatus are provided for estimating motion and sequence of video images. A plurality of fields of a sequence of video images are stored, then, for each of plurality of blocks of pixels in each field, a test is performed on a set of candidate motion vectors to determine which motion vector gives the best fit in determining the motion between adjacent fields for that block. The testing step includes determining the amount of motion blur present in the image and modifying the testing of candidate motion vectors in dependence on this motion blur.

15 Claims, 3 Drawing Sheets

(56) References Cited

OTHER PUBLICATIONS

B.K.P. Horn & B.G. Schunck, "Determining Optical Flow", *Artificial Intelligence*, vol. 16, No. 1-3, Aug. 1981, pp. 185-203.

D. Ziou and S. Tabbone, "Edge Detection Techniques—An Overview", *Pattern Recognition and Image Anal.*, vol. 8, No. 4, 1998.

Gerald de Haan, Paul W.A.C. Biezen, Henk Huijgen, and Olukayode A. Ojo, True-Motion Estimation with 3-D Recursive Search Block Matching, IEEE, Transactions on, vol. 3, No. 5, Oct. 1993, pp. 368-379.

* cited by examiner

PRIOR ART

PRIOR ART

MOTION ESTIMATION

BACKGROUND TO THE INVENTION (PRIOR ART)

The invention relates to methods and apparatus for motion estimation and the determination of motion vectors between fields of video image sequences.

Motion video consists of a sequence of fields or frames. Motion estimation algorithms exploit the fact that these frames do not change significantly in time. Motion vector fields are calculated that attempt to describe the displacement of each pixel in a frame to an earlier frame. The image is after divided into a grid so that a single motion vector is associated with a group, or block, of pixels to reduce computational complexity.

Motion estimation is useful for several applications including, for example, motion compensated interpolation, where a number of interpolated frames are reconstructed and displayed between original images in a sequence. This reduces the motion judder of moving objects in the image sequence. The motion vectors here can be defined at any point in-between the two images, for example the midpoint, and are also used to reconstruct the interpolated frame using motion compensation.

A further application is video compression, for example, where spatial and/or temporal redundancy is removed. Motion vectors are again used to describe the displacement of image pixels between successive frames and, in this application, are transmitted in place of image data, thereby reducing the amount of data needed to represent the image sequence.

Other applications that use motion estimation to enhance video sequences include de-interlacing and noise reduction.

Motion estimation can be performed using a number of different methods, including, for example:

Block-matching techniques as described in section II of De Haan, G.; Biezen, P. W. A. C. "An efficient true-motion estimator using candidate vectors from a parametric motion model," *Circuits and Systems for Video Technology*, IEEE Transactions on Vol. 8, Issue 1, February 1998, pp. 85-91.

Gradient based techniques as described in Horn, B. K. P. & B. G. Schunck, "Determining Optical Flow," *Artificial Intelligence*, Vol. 16, No. 1-3, August 1981, pp. 185-203.

A common goal of motion estimators is to evaluate the suitability of a particular motion vector. This can be achieved, for example, by some form of error function, typically based on a criterion such as the sum of absolute differences (SAD), or the mean squared error (MSE) of intensity values.

Detection and measurement of motion blur is also relevant to the derivation of motion vectors. Motion blur is an effect that occurs in natural image sequences as cameras attempt to capture moving objects. If an object moves while the camera shutter is open, the film acts as an integrating medium and the motion that has occurred is visible as a blur along the trajectory of motion. This effect is shown in FIG. 1.

The faster an object is moving relative to the camera, the greater the motion blur. Hence the sharpness of edges in an area of the image can be used as an indication of the level of motion. This can be extended further by utilising the fact that motion blur occurs only along the trajectory. If sharp edges are detected in a particular direction, it can be deduced that in a perpendicular direction, fast motion is unlikely. FIG. 2 illustrates this point further. In example A there is vertical motion and the vertical edges are sharp whilst the horizontal edges are soft. In example B the motion is horizontal and therefore the horizontal edges are sharp and the vertical edges are soft.

There are numerous well-known methods for measuring the level of motion blur, or strength of edges, within an image. A simple method, for example, measures the intensity gradient of pixels across a small area. High intensity gradients signify strong or sharp edges, whereas low gradients signify soft or blurred edges. An in-depth overview of Edge Detection Techniques is provided in D. Ziou and S. Tabbone, "Edge detection techniques—an overview," *Pattern Recognition and Image Anal.*, vol. 8, no. 4, 1998, but these techniques will be known to those skilled in the art.

Evaluation criteria, for example the SAD or MSE, do not always lead to selection of the correct vector. This becomes particularly important for applications such as motion compensated interpolation where the true motion vectors are desirable. Ambiguities arise, for example, where there are small objects or details in an image sequence. In these areas, erroneous motion vectors could be found that match similar blocks either side of the small detail. This is illustrated in FIG. 3.

Furthermore, many motion estimator schemes operate under the assumption that the intensity of moving objects remains constant. This is not always the case as there are lighting changes in image sequences and these can cause erroneous motion vectors that try to find blocks of a similar intensity.

Other ambiguities arise where there is more than one motion associated with an area of the image, for example, transparent areas or reflections.

In addition, motion estimators are often recursive and several iterations are required before the motion vector field is accurate. This leads to a need for improving the evaluation of candidate vectors.

Some schemes have already been proposed to reduce the ambiguities of vector evaluations. These include penalising candidates depending on their location, for example candidates chosen from a temporal location not yet processed are penalised more than those chosen from a more recently processed location.

Other schemes involve adding a penalty to the error function related to the difference between the candidate and some neighbouring vectors.

A further scheme is proposed in U.S. Pat. No. 6,782,054 where an additional term is added to the error function that is dependent on the overall size and position of the candidate.

SUMMARY OF THE INVENTION

Preferred embodiments of the present invention use motion blur information, present in a local image area, to calculate a directional weighting term. The weighting term, which is comprised of two independent horizontal and vertical terms, is used as part of the vector evaluation to improve the selection of vectors and provide faster convergence on the correct vector.

By estimating the motion blur within an area of the image, it can be broadly deduced in which direction motion is occurring. Using this information, vectors not consistent with the measured motion blur can be penalised by adjusting the relevant weighting term.

The weighting term is dependent on the level of motion, the direction and the magnitude of the candidate vector.

In a further embodiment of the invention, the motion blur information can be used to detect areas of the image where problems may arise due to persistent small, static or slow moving objects and overlays. These problem areas are characterised by strong edges in both the horizontal and vertical directions. If these characteristics are detected consistently over a number of frames in the same image, then the motion estimation can safeguard against erroneous vectors and artefacts by reducing the maximum allowed vector size, for example.

BRIEF DESCRIPTION OF THE DRAWINGS

An embodiment of the invention will now be described in detail by way of example with reference to the accompanying drawings in which.

DETAILED DESCRIPTION OF A PREFERRED EMBODIMENT

Figure 4:
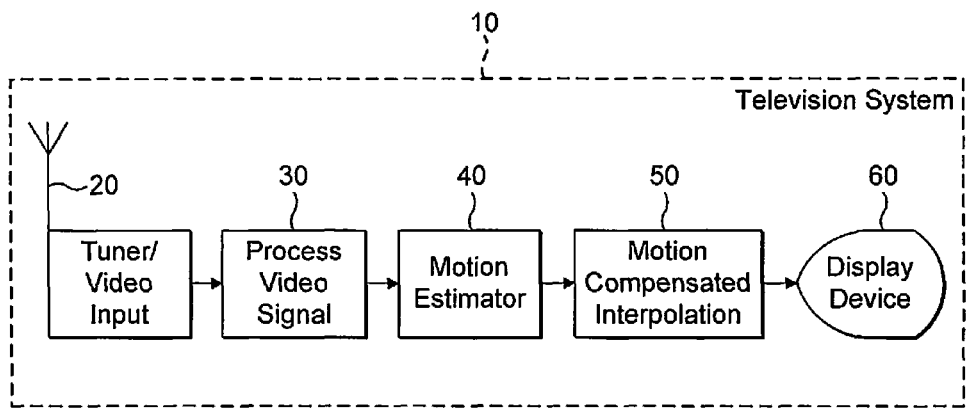
FIG. 4 is a block diagram of the embodiment of the invention.

An embodiment of the invention can be incorporated into a television system that uses motion compensated interpolation to increase the frame rate of a motion video sequence. FIG. 4 shows an embodiment of the invention into such a television system (10). An antenna (20) (or other video input, such as a DVD player) supplies a tuner with a received signal which in turn provides a video signal to the processor (30) which demodulates the signal. The demodulated signal is then supplied to a motion estimator unit (40). The temporal frame rate of the video signal is increased by a motion compensated interpolator (50) using motion vectors supplied from the motion estimator (40). The enhanced video signal is then displayed on a display device (60). The interpolation could be used, for example, to enhance the frame rate from 50 $H_z$ with interlace to 100 $H_z$ without interlace.

A preferred embodiment of the motion estimation used in FIG. 4 uses a block-matching method, and is described with reference to FIG. 5.

The motion estimate (40) comprises two or more field memories (41) which are used to store the pixels for each block of respective ones of the input field or frame sequences. This data is supplied to a candidate evaluation unit (43). For each pixel of a block of an input field, the candidate evaluation unit tests a number of candidate motion vectors to determine which give the best fit in matching the data in a first field to the data in a second field, and after doing this, determines an overall best fit block motion vector which can then be used for the whole block.

The candidate evaluation unit (43) is supplied with candidate vectors by a candidate selection (42). This candidate selection takes several spatial and temporal candidate vectors from sites around the block that have previously been calculated in the frame. Temporal candidate vectors come from block locations around the current block that were calculated earlier in the sequence. These candidate vectors are retrieved from a vector memory (46) by the candidate selection (42).

Evaluation of candidate vectors is performed by a modified candidate evaluation unit (45) which determines the most suitable candidate vector for each pixel. The modification to the candidate evaluation process arises through use of a motion blur evaluation unit (44) which determines the presence of motion blur in the block at that pixel. This is a measure related to the strength of the horizontal and vertical edges at that pixel. This can be computed for the whole block and can be done on a pixel by pixel basis.

Once the motion blur has been estimated it is used to modify the evaluation of candidate vectors. Candidates with large components that are inconsistent with the motion blur are penalised where those with large components in the motion blur direction are unaffected. This is achieved by using a weighting factor in the candidate evaluation unit (45), based on the measured motion blur.

The candidate selector also ensures that the candidate vectors are within the maximum allowed vector range, ($+-Max_x$, $+-Max_y$). This range may be initially determined by hardware limitations, for example the size of the field memory. In this embodiment, the maximum allowed vector size is subsequently set according to a counter associated with the block. This is described in more detail below. Any vectors exceeding the allowed range are clamped accordingly.

The candidate evaluator (43) that attempts to select the best match for a block of pixels, typically 8×8 pixels in size.

The candidate selector (42) chooses a number of candidate motion vectors, $$\vec{C} = \begin{bmatrix} C_X \\ C_Y \end{bmatrix},$$

to be evaluated for a block. In this implementation, several spatial and temporal candidate vectors are selected from positions around the current block from the vector memory (46), and supplied to the candidate evaluator (43). Spatial candidates come from block locations around the current block that have previously been calculated in the frame. Temporal candidates can come from block locations around the current frame that were calculated in an earlier frame. Within the candidate evaluator, vectors are compared to determine the most suitable candidate using an error function.

Typically, the SAD is used as the basis of the error function, as described by Equation 1.

$$SAD(\vec{C}, \vec{x}) = \sum_{x \in B(\vec{x})} |F(\vec{x}, n) - F(\vec{x} - \vec{C}, n-1)|, \quad \text{Equation 1}$$

where $\vec{C}$ represents a candidate motion vector, $$\vec{x} = \begin{bmatrix} x \\ y \end{bmatrix}$$

represents the spatial location, $B(\vec{x})$ represents the block of pixels over which evaluation occurs and $F(\vec{x}, n)$ represents the pixel intensity value at spatial location $\vec{x}$ and temporal location n. This pixel information is retrieved from the field memory (41), as shown in FIG. 5. The candidate with the lowest error function is determined to be the best match for the current block, and the associated motion vector is assigned to the block of pixels.

Figure 5:
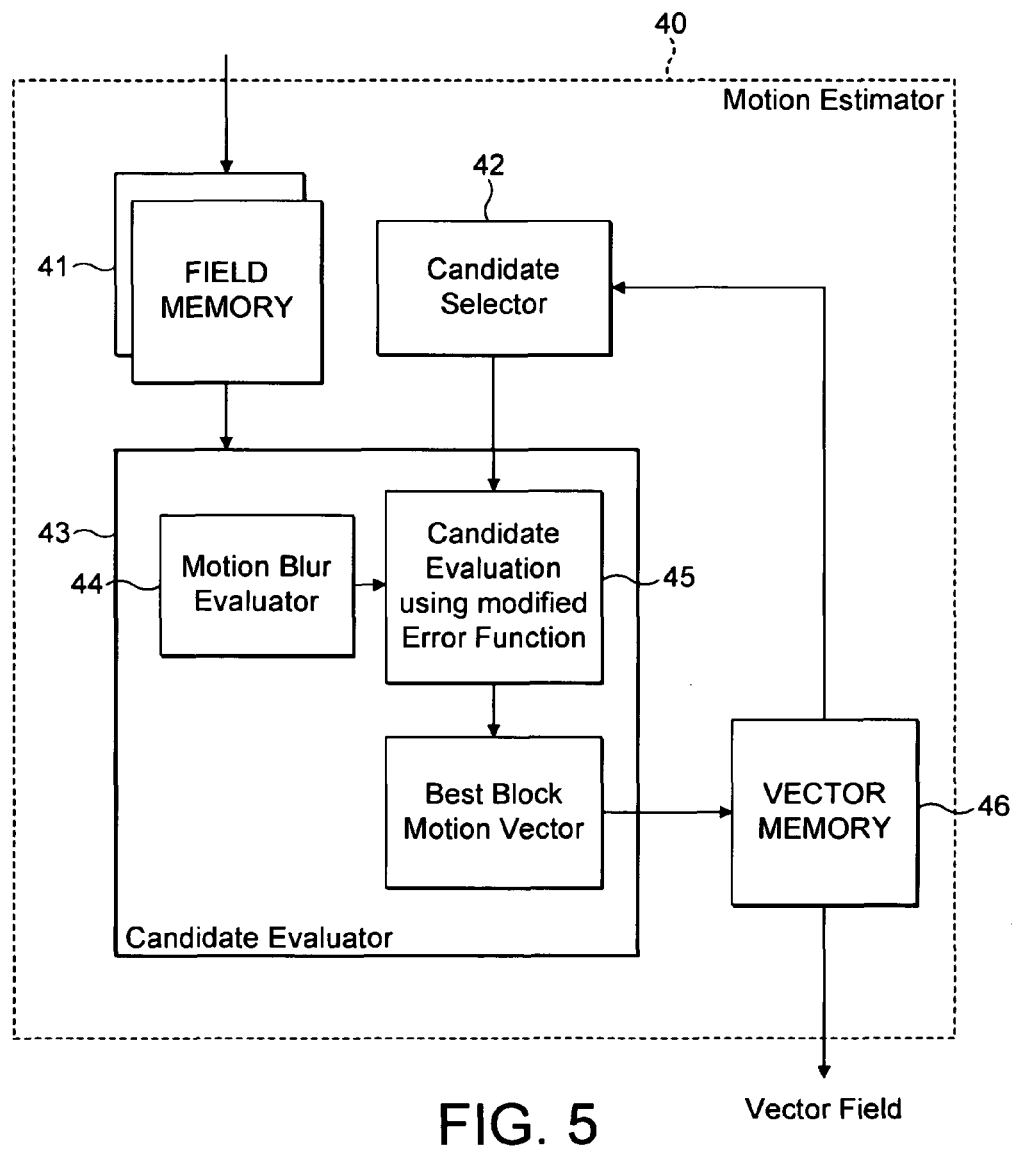
FIG. 5 is a detailed block diagram of the motion estimator of FIG. 4.

To improve the motion estimation, the invention utilises additional terms in the error function that depend on the likely strength and direction of motion, which operate on the independent vector components. The error function, for this implementation, is then described by Equation 2.

$$\text{Errf}(\vec{C}, \vec{x}) = \text{SAD}(\vec{C}, \vec{x}) + \{(W_H \times C_X) + (W_V \times C_Y)\} \quad \text{Equation 2,}$$

where $C_X$ and $C_Y$ are the horizontal and vertical components of the candidate vector respectively, and $W_H$ and $W_V$ are scale factors determined by the motion blur evaluator (44), as shown in FIG. 5.

As discussed earlier, there are numerous methods for evaluating the level of motion blur, or strength of edges, in an image. While the invention is not limited to a particular method of motion blur evaluation, a simple method, for example, is to use an edge detection kernel such as the Sobel, Prewitt or Roberts kernel. For simplicity, the implementation described will incorporate the use of the 3×3 Prewitt operator. The horizontal and vertical kernels are shown in Equations 3 and 4 respectively.

The convolution can be performed on pixels from the previous frame (at temporal location n−1) or the current frame (at temporal location n). However, since the block may be in motion the preferred embodiment uses pixels from the most recent frame.

$$k_h(i, j) = \begin{bmatrix} -1 & -1 & -1 \\ 0 & 0 & 0 \\ 1 & 1 & 1 \end{bmatrix} \quad \text{Equation 3}$$

$$k_v(i, j) = \begin{bmatrix} -1 & 0 & 1 \\ -1 & 0 & 1 \\ -1 & 0 & 1 \end{bmatrix} \quad \text{Equation 4}$$

For a pixel at location $$\vec{z} = \begin{bmatrix} x \\ y \end{bmatrix},$$

the output of the convolution is given by Equation 5. The absolute value of E is then an indication of the strength of edges at the central pixel location.

$$E = \sum_{i=-1}^{1} \sum_{j=-1}^{1} \left\{ k_{h/v}(i, j) \times F\left(\vec{z} + \begin{bmatrix} i \\ j \end{bmatrix}, n\right) \right\} \quad \text{Equation 5}$$

A particular kernel, such as the Prewitt operator, can be used in a number of different ways to obtain an overall measure for the level of horizontal and vertical motion blur in a localised area. It is possible, for example, to accumulate the results of convolution over pixels in an arbitrarily sized area centered on the current block. Another possibility is to perform separate convolutions on the pixels in a given area and the maximum absolute output from the convolutions could be stored.

For this example, the implementation described will use the latter technique and performs the horizontal and vertical convolution on each pixel within the block at the current location, and stores the maximum absolute output for each direction. These values, $|E_{H\_MAX}|$ and $|E_{V\_MAX}|$, represent the strongest horizontal and vertical edges present in the block respectively.

Figure 1:
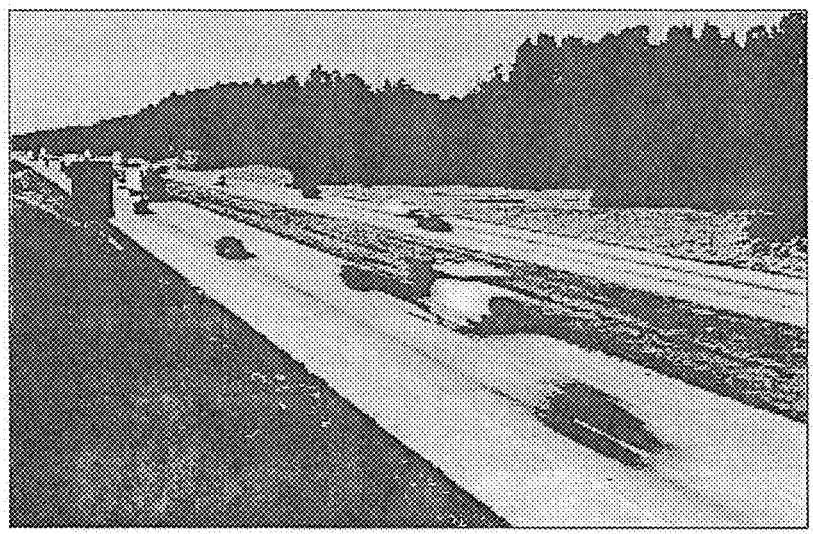
FIG. 1 is an illustration of motion blur.
Figure 2:
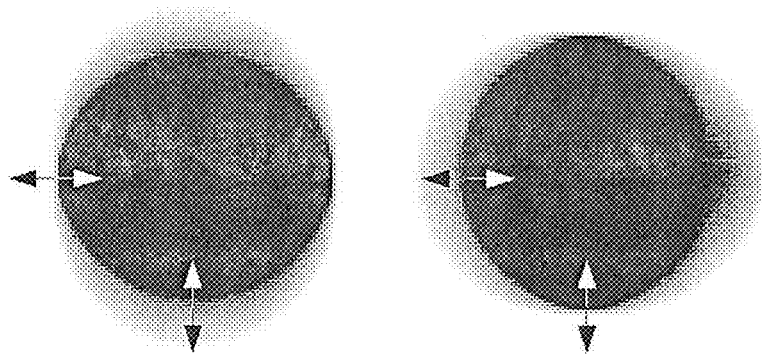
FIG. 2 shows the effect of motion blur in more detail.
Figure 3:
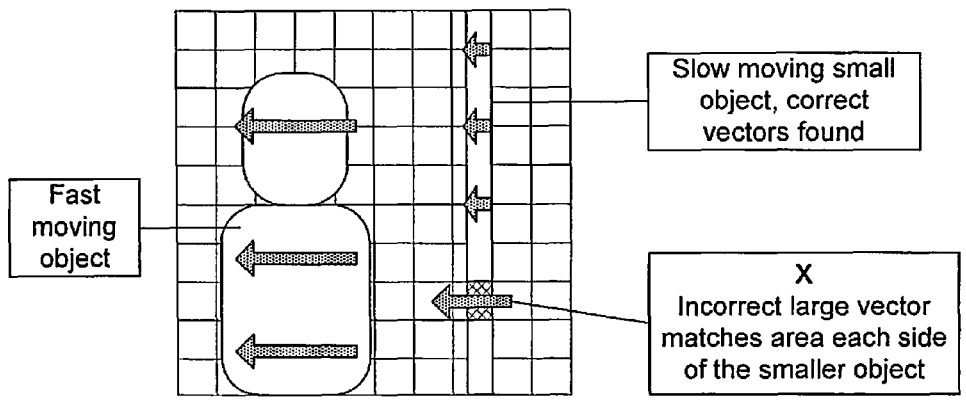
FIG. 3 illustrates how erroneous motion vectors can arise.

As previously illustrated in FIG. 2, for strong horizontal edges (weak horizontal motion blur), we wish to penalise candidate vectors with larger y-components. For strong vertical edges (weak vertical motion blur), we wish to penalise candidate vectors with larger x-components. The scale factors $W_H$ and $W_V$ are therefore set as described by Equations 6 and 7.

$$W_H = |E_{V\_MAX}| \times k \quad \text{Equation 6}$$

$$W_V = |E_{H\_MAX}| \times k \quad \text{Equation 7,}$$

where k is a constant that multiplies the convolution output to control the effect of the biasing on the vector evaluation. Increasing k increases the biasing that the incorporated invention provides.

With these scale factors now available from the motion blur evaluator (44), and pixel information from the field memory (41), the selected candidates can be evaluated using the modified error function (45), as shown in FIG. 5. Candidates that have large vector components that are inconsistent with the detected motion blur are penalised, whereas vectors in the appropriate direction are largely unaffected.

From the selection of candidates, the best matching vector with the lowest error function is determined and assigned to the current block in the vector memory (46), as shown in FIG. 5.

Preferred embodiments of the invention also reduce artefacts in problem areas by utilising the motion blur information as follows. If the detected strongest edges, $|E_{H\_MAX}|$ and $|E_{V\_MAX}|$, are both above a defined threshold Edge Limit, then the block may contain small static details or be part of an overlay and could therefore be part of a problem area. For this reason, the counter associated with the block (48) is incremented in this case. If both edge measurements are not above the threshold, then the counter is reset to zero. The higher the counter, the more confident the algorithm can be that static detail is present in this block, hence the motion estimation can be more restrictive in the vector range allowed. For example in this implementation, the candidate selector (42) sets the maximum allowed vector range for a block in subsequent iterations according to Equations 8 and 9:

$$\text{Max}'_x = \text{Max}_x / (C+1) \quad \text{Equation 8}$$

$$\text{Max}'_y = \text{Max}_y / (C+1) \quad \text{Equation 9,}$$

where C is the counter associated with the current block. The counter is limited to the range 0 to 5. For image sequences with small static detail, or overlays that persist for several frames, the algorithm now increasingly reduces the vector range for these image areas reducing the likelihood of artefacts.

The vector field from the motion estimator (40) is then used by the motion compensated interpolator (50), as shown in FIG. 4, to reconstruct new frames to increase the frame rate of the video signal.

The invention allows the motion estimator to generate an improved vector field by selectively penalising unlikely candidates and provides faster convergence towards the true motion of objects in the image sequence.

I claim:

1. A method for estimating motion in a sequence of video images comprising:
    storing a plurality of fields of a sequence of video images, for each of a plurality of blocks of pixels in each field; and
    testing, for each block of the plurality of blocks, a plurality of candidate motion vectors to determine which candidate motion vector gives the best fit in determining the motion in the image between adjacent fields for that block, wherein the testing comprises determining the amount of motion blur present in a portion of the image including that block, and modifying the testing of candidate motion vectors in dependence on the thus determined motion blur, by applying a weighting factor to each candidate motion vector in dependence on the determined motion blur, the weighting factor for each candidate motion vector being dependent on the direction of the candidate motion vector relative to the direction of the motion blur, wherein candidate motion vectors with vector components which are inconsistent with the direction of the determined motion blur are penalised by the weighting factor for that candidate motion vector.

2. The method according to claim 1, wherein the candidate motion vectors have magnitudes within a predetermined range.

3. The method according to claim 2, wherein the candidate motion vectors which have a magnitude greater than the predetermined range are clamped to the range.

4. Apparatus for estimating motion in a sequence of video images comprising:
a memory; and
a candidate motion vector evaluation unit comprising a motion blur evaluator configured to determine the amount of motion blur present in a portion of a sequence of video images including that block stored in the memory, and configured to test, for each of a plurality of blocks of pixels in each field of a plurality of fields in the sequence of video images, a plurality of candidate motion vectors to determine which motion vector gives the best fit in determining the motion between adjacent fields for that block,
wherein the candidate motion vector evaluation unit is configured to modify the testing of candidate motion vectors in dependence on the thus determined motion blur, by applying a weighting factor to each candidate motion vector in dependence on the determined motion blur, the weighting factor for each candidate motion vector being dependent on the direction of the candidate motion vector relative to the direction of the motion blur, to thereby penalise, by the weighting factors, the candidate motion vectors with vector components which are inconsistent with the direction of the determined motion blur.

5. The apparatus according to claim 4, wherein the candidate motion vectors have magnitudes within a predetermined range.

6. The apparatus according to claim 4, wherein the candidate motion vector evaluation unit is configured to clamp candidate motion vectors which have a magnitude greater than the predetermined range to the range.

7. The method according to claim 1, wherein the motion blur is determined in dependence on strength of horizontal and vertical edges of an object.

8. The method according to claim 7, wherein for blocks with strong horizontal edges present, the candidate motion vectors with large vertical vector components are penalized.

9. The method according to claim 7, wherein for blocks with strong vertical edges present, the candidate motion vectors with large horizontal vector components are penalized.

10. The apparatus according to claim 4, wherein the motion blur is determined in dependence on strength of horizontal and vertical edges of an object.

11. The apparatus according to claim 10, wherein for blocks with strong horizontal edges present, the candidate motion vectors with large vertical vector components are penalized.

12. The apparatus according to claim 10, wherein for blocks with strong vertical edges present, the candidate motion vectors with large horizontal vector components are penalized.

13. A system for displaying video, comprising:
a source for a sequence of frames from a video signal;
a memory; and
a motion estimator coupled with the memory, the motion estimator configured for determining, for each of a plurality of blocks of pixels in the sequence of frames, motion blur present in a portion of the frame including that block and to evaluate candidate motion vectors in dependence on the determined motion blur, by applying a weighting factor to each candidate motion vector in dependence on the determined motion blur, the weighting factor for each candidate motion vector being dependent on a direction of the candidate motion vector relative to a direction of the motion blur, the weighting factor selected to penalize candidate motion vectors with vector components that are inconsistent with a direction of the determined motion blur; and for outputting a best-matching vector for use in forming a vector field for a frame of video.

14. The system for displaying video of claim 12, further comprising an interpolator that produces an interpolated frame based on two or more frames in the sequence, and the motion estimator is configured to output the vector field to the interpolator to reconstruct one or more new frames to increase the frame rate of the video signal.

15. The video system for displaying video of claim 12, wherein the motion estimator comprises a motion vector candidate evaluation unit comprising further comprising a memory coupled with the motion estimator for storing a motion vector field for a frame of the sequence, the motion vectors in the field representing an estimate of true motion of objects in the sequence of frames.

* * * * *